(12) United States Patent
Lu et al.

(10) Patent No.: US 9,385,572 B2
(45) Date of Patent: Jul. 5, 2016

(54) DC BRUSHLESS MOTOR WITH EXTERNAL ROTOR

(71) Applicant: Zhongshan Broad-Ocean Motor Co., Ltd., Zhongshan (CN)

(72) Inventors: Chuping Lu, Zhongshan (CN); Songfa Tang, Zhongshan (CN); Chongsheng Zeng, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 265 days.

(21) Appl. No.: 13/844,968

(22) Filed: Mar. 16, 2013

(65) Prior Publication Data

US 2014/0117799 A1 May 1, 2014

(30) Foreign Application Priority Data

Oct. 31, 2012 (CN) ...................... 2012 2 0569541 U (51) Int. Cl.
*H02K 1/27* (2006.01)
*H02K 1/28* (2006.01)
*H02K 11/00* (2016.01)
*H02K 5/16* (2006.01)
*H02K 21/22* (2006.01)
*H02K 7/00* (2006.01)

(52) U.S. Cl.
CPC .............. *H02K 5/165* (2013.01); *H02K 1/2786* (2013.01); *H02K 1/28* (2013.01); *H02K 7/003* (2013.01); *H02K 11/0094* (2013.01); *H02K 21/22* (2013.01)

(58) Field of Classification Search
CPC ..... H02K 15/165; H02K 1/187; H02K 2/786; H02K 7/02; H02K 5/15; H02K 5/04; H02K 21/22

USPC ........... 482/54, 76 R; 174/50; 310/71, 89, 90, 310/156.28, 348, 413, 91

See application file for complete search history.

(56) References Cited

U.S. PATENT DOCUMENTS

| | | | | |
|---|---|---|---|---|
| 1,411,442 A | * | 4/1922 | Leece | 310/89 |
| 2,722,618 A | * | 11/1955 | Dochterman | 310/413 |
| 3,303,365 A | * | 2/1967 | Hennessey | H02K 7/116 310/83 |

(Continued)

FOREIGN PATENT DOCUMENTS

| | | | |
|---|---|---|---|
| AU | 2011100860 A4 | * | 10/2011 |
| CN | 201226473 | * | 4/2009 |

(Continued)

OTHER PUBLICATIONS

English abstract for WO 8501399.*

(Continued)

*Primary Examiner* — Terrance Kenerly
*Assistant Examiner* — Ahmed Elnakib
(74) *Attorney, Agent, or Firm* — Matthias Scholl, PC; Matthias Scholl (57) ABSTRACT

A DC brushless motor having an external rotor, the motor including: a shaft, a stator assembly, an end cover, a housing, and a plurality of permanent magnets. The end cover includes a bearing. The housing includes: an inner wall, and an end. The shaft is connected with the stator assembly. The stator assembly is arranged inside the housing. The permanent magnets are positioned outside the stator assembly on the inner wall of the housing. The end cover is disposed on the end of the housing. The shaft is disposed on the bearing of the end cover.

7 Claims, 7 Drawing Sheets

(56) References Cited

U.S. PATENT DOCUMENTS

| | | | | |
|---|---|---|---|---|
| 3,359,439 A | * | 12/1967 | Fjuimoto | 310/74 |
| 5,027,026 A | * | 6/1991 | Mineta et al. | 310/216.127 |
| 5,200,658 A | * | 4/1993 | Kohno et al. | 310/89 |
| 5,679,989 A | * | 10/1997 | Buscher | H02K 26/00 29/596 |
| 5,861,694 A | * | 1/1999 | Niemela | 310/89 |
| 5,932,942 A | * | 8/1999 | Patyk et al. | 310/58 |
| RE38,179 E | * | 7/2003 | Elsasser et al. | 360/98.07 |
| 6,661,136 B1 | * | 12/2003 | Lee | H02K 5/00 310/74 |
| 6,664,436 B2 | * | 12/2003 | Topolkaraev et al. | 604/361 |
| 2005/0104469 A1 | * | 5/2005 | Zepp | H02K 7/12 310/191 |
| 2006/0238059 A1 | * | 10/2006 | Komatsu | H02K 1/14 310/162 |
| 2007/0048156 A1 | * | 3/2007 | Chung et al. | 417/417 |
| 2011/0080062 A1 | * | 4/2011 | Noh et al. | 310/71 |
| 2014/0284183 A1 | * | 9/2014 | Wolters et al. | 198/788 |

FOREIGN PATENT DOCUMENTS

| | | | |
|---|---|---|---|
| CN | 202218127 | * | 5/2012 |
| GB | 1296429 | * | 11/1972 |
| JP | WO 8501399 | * | 3/1985 |
| JP | WO 8501399 A | * | 3/1985 |
| KR | EP 1018795 | * | 7/2000 |

OTHER PUBLICATIONS

English abstract for CN 201226473.*
English abstract for CN202218127.*

* cited by examiner

DC BRUSHLESS MOTOR WITH EXTERNAL ROTOR

CROSS-REFERENCE TO RELATED APPLICATIONS

Pursuant to 35 U.S.C. §119 and the Paris Convention Treaty, this application claims the benefit of Chinese Patent Application No. 201220569541.2 filed Oct. 31, 2012, the contents of which are incorporated herein by reference.

BACKGROUND OF THE INVENTION

1. Field of the Invention

The invention relates to a DC brushless motor having an external rotor.

2. Description of the Related Art

For a typical DC brushless motor having an external rotor, one end of a shaft is connected with a rotor body; the other end of the shaft is connected with a flange, so that the shaft rotates along with the rotor and drives the flange to rotate. However, the rotor is disposed on one side; a force is unevenly distributed on the motor. After the flange and the external wind wheel are installed and connected, the whole system runs unsteadily which affects air speed of a wind wheel.

SUMMARY OF THE INVENTION

In view of the above-described problems, it is one objective of the invention to provide a DC brushless motor having an external rotor that has a simple structure, uneven force distribution, and a steady operation of a system.

To achieve the above objective, in accordance with one embodiment of the invention, there is provided a DC brushless motor having an external rotor, comprising: a shaft; a stator assembly; an end cover, the end cover comprising a bearing; a housing, the housing comprising: an end, and an inner wall; and a plurality of permanent magnets. The shaft is connected with the stator assembly; the stator assembly is arranged inside the housing. The permanent magnets are positioned outside the stator assembly on the inner wall of the housing. The end cover is disposed on the end of the housing. The shaft is disposed on the bearing of the end cover.

In a class of this embodiment, a plurality of mounting bosses is disposed on the end of the housing above end surfaces of the permanent magnets. Each mounting boss comprises a threaded hole. The end cover comprises a through hole. A screw passes through the through hole of the end cover and is screwed into the threaded hole for fixing the end cover on the housing.

In a class of this embodiment, a gap is arranged in an axial direction on a side wall of the end cover outside the through hole. A recess in a ring shape is arranged on the side wall of the end cover. The gap is in communication with the recess. An end of the inner wall of the housing is convex to form a fixture block. The fixture block passes through the gap and is inserted into the recess.

In a class of this embodiment, an end surface of the end cover is provided with a plurality of clay recesses for correcting a dynamic balance.

In a class of this embodiment, a mounting bracket is arranged outside the housing.

In a class of this embodiment, the stator assembly comprises: a stator core, and a winding. The winding is wound on the stator core. One end of an external lead is connected with one end of the winding; and the other end of the external lead passes through a shaft hole of the shaft.

In a class of this embodiment, the permanent magnets are stuck to the inner wall of the housing by glue.

Advantages of the invention are summarized as follows:

1) The DC brushless motor having an external rotor of the invention comprises: the shaft, the stator assembly, the end cover, the housing, and a plurality of permanent magnets. The shaft is connected with the stator assembly. The stator assembly is arranged inside the housing. The permanent magnets are positioned outside the stator assembly on the inner wall of the housing. The end cover is disposed on the end of the housing. The shaft is disposed on a bearing of the end cover. The invention has a simple structure, uneven force distribution, and a steady operation of a system.

2) A plurality of mounting bosses is disposed on the end of the housing above end surfaces of the permanent magnets. The threaded hole is disposed on the mounting boss. The screw passes through a through hole of the end cover and is screwed into the threaded hole for fixing the end cover on the housing. The structure is reasonably designed, and the connection is firm.

3) The gap is arranged in the axial direction on a side wall of the end cover outside the through hole. The recess in a ring shape is arranged on the side wall of the end cover. The gap is in communication with the recess. The end of the inner wall of the housing is convex to form the fixture block, and the fixture block passes through the gap and is inserted into the recess. Thus, the end cover is fixed in the axial direction.

4) An end surface of the end cover is provided with a plurality of clay recesses for correcting a dynamic balance. Clay used to correct the dynamic balance is disposed on the clay recesses.

5) The mounting bracket is arranged outside the housing; the mounting bracket is connected having an external wind wheel, which has an even force distribution and firm connection.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a DC brushless motor having an external rotor are described below. It should be noted that the following examples are intended to describe and not to limit the invention.

Example 1

Figure 1:
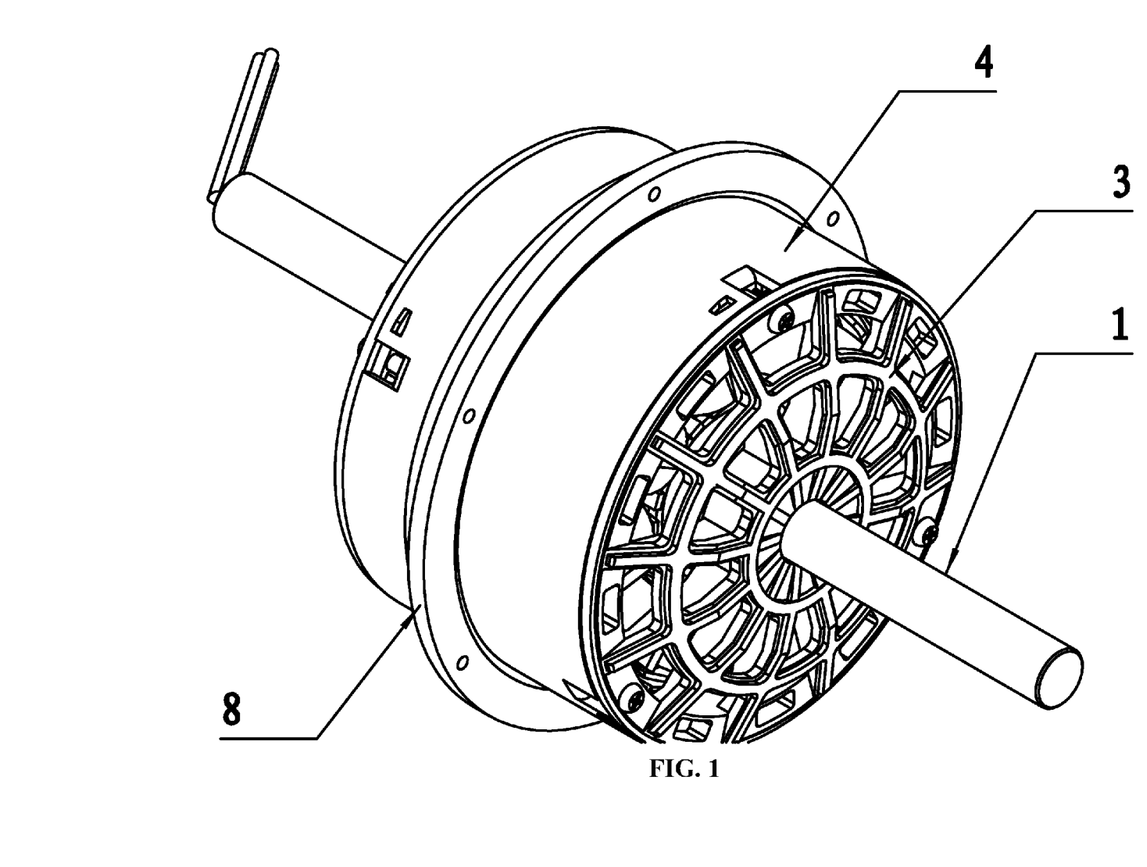
FIG. 1 is a stereogram of a DC brushless motor having an external rotor in accordance with one embodiment of the invention.
Figure 2:
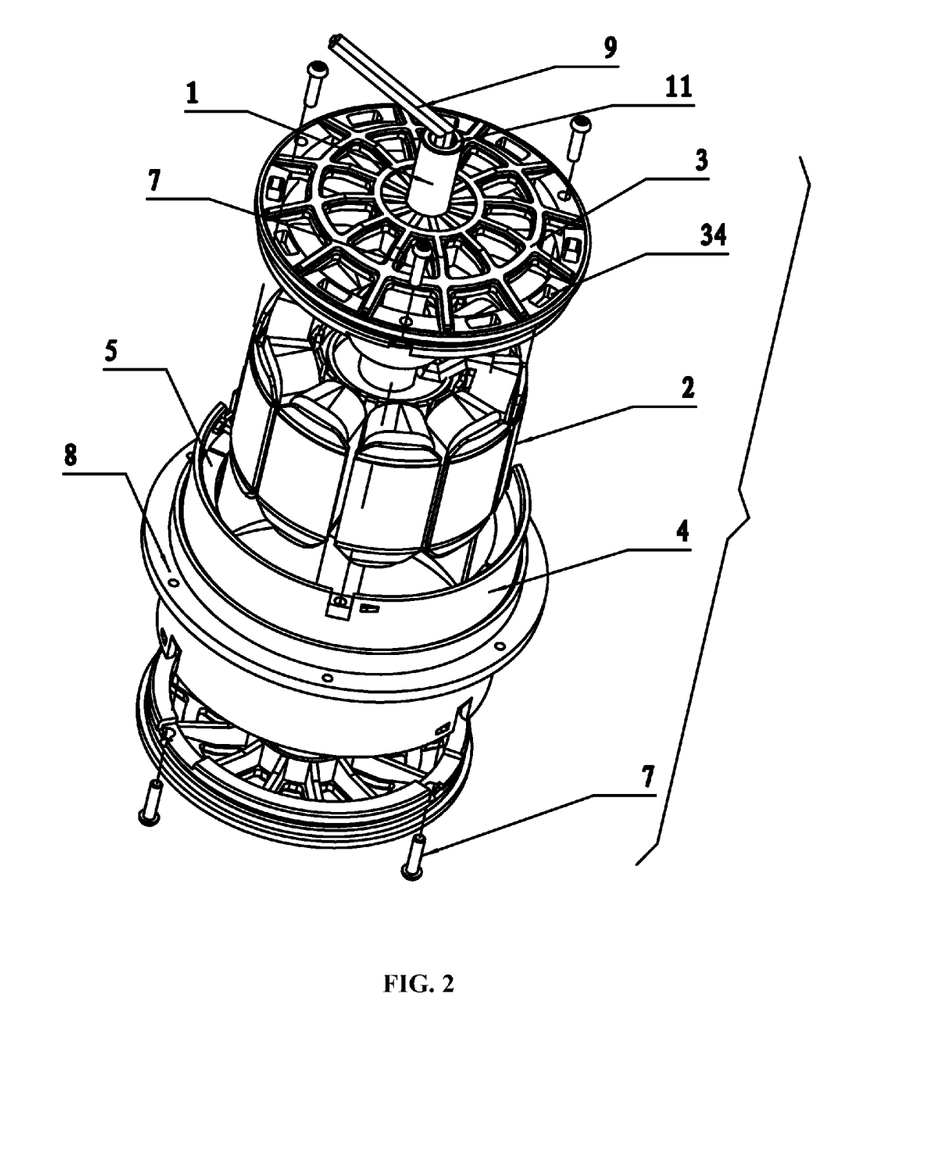
FIG. 2 is an exploded view of a DC brushless motor having an external rotor in accordance with one embodiment of the invention.
Figure 3:
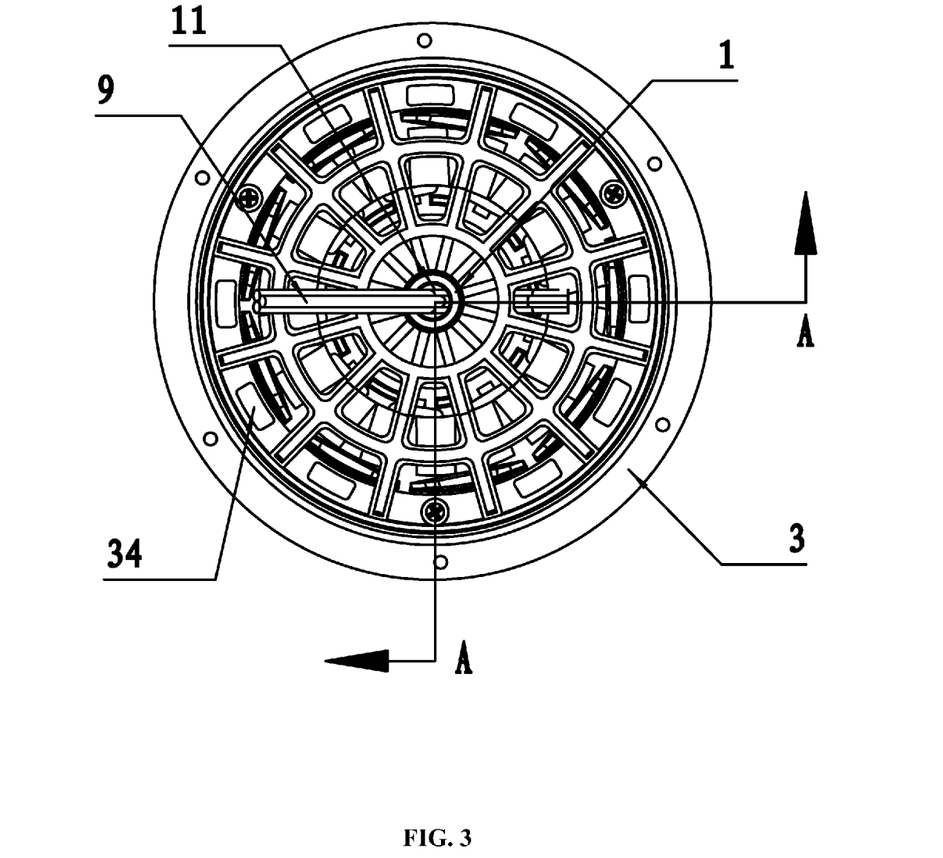
FIG. 3 is a structure diagram of a DC brushless motor having an external rotor in accordance with one embodiment of the invention.
Figure 4:
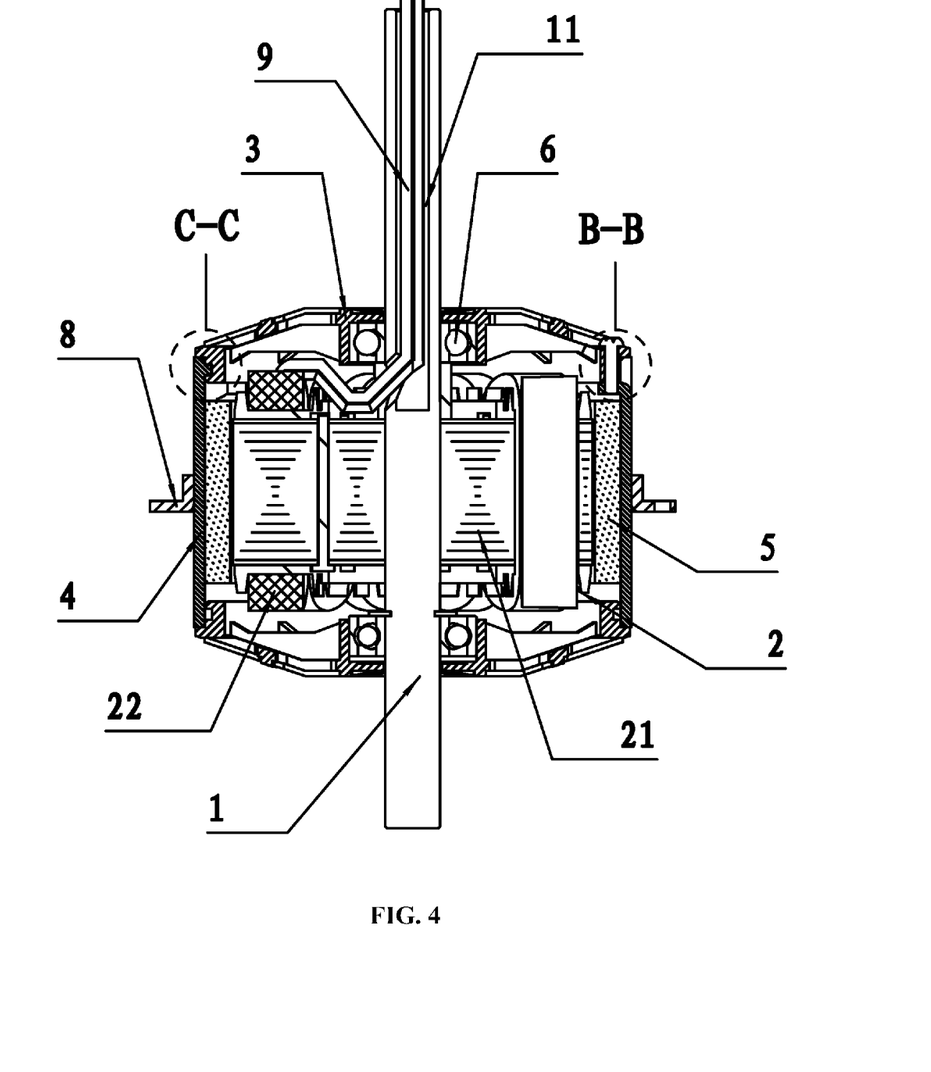
FIG. 4 is a cross sectional view of FIG. 3 taken from line A-A.
Figure 5:
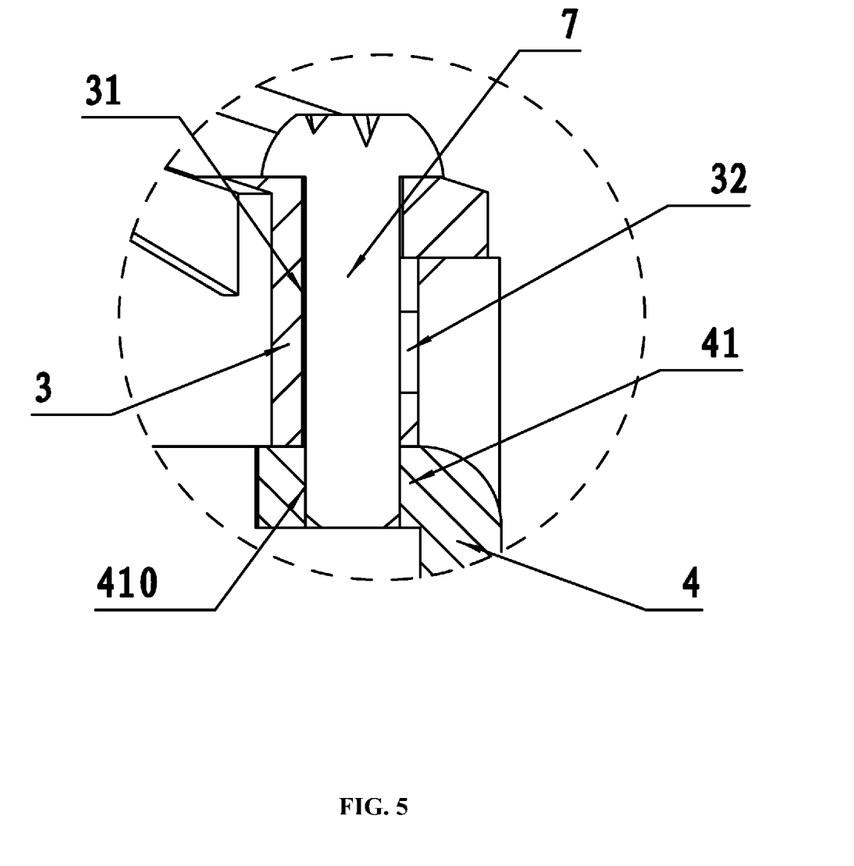
FIG. 5 is an enlarged view of part B-B of FIG. 4.
Figure 6:
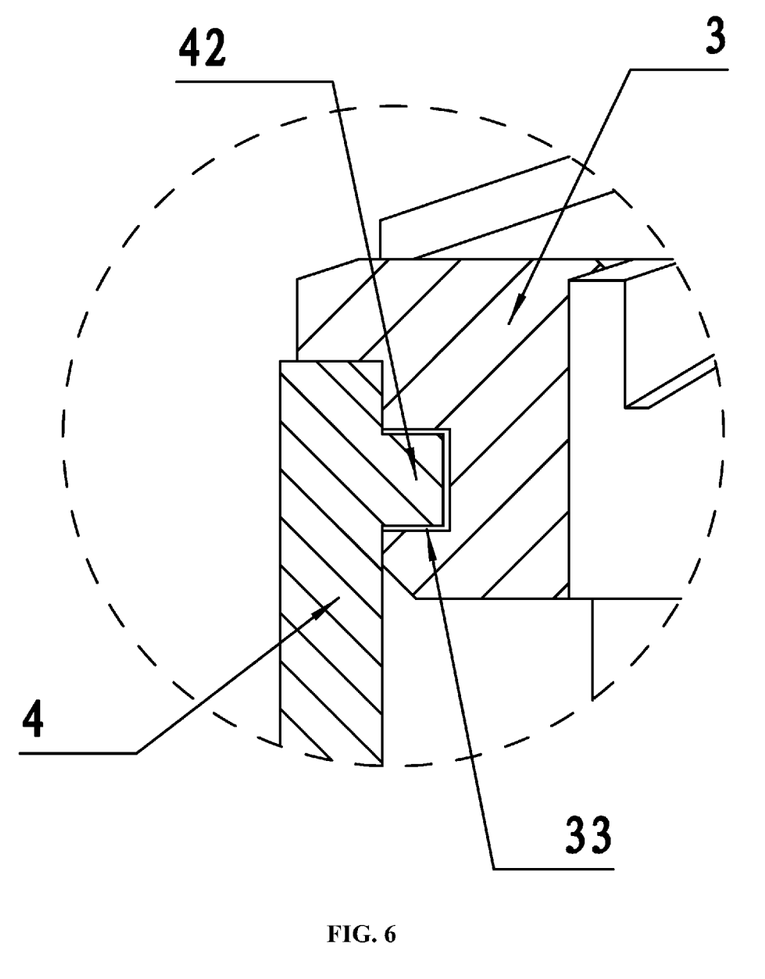
FIG. 6 is an enlarged view of part C-C of FIG. 4.
Figure 7:
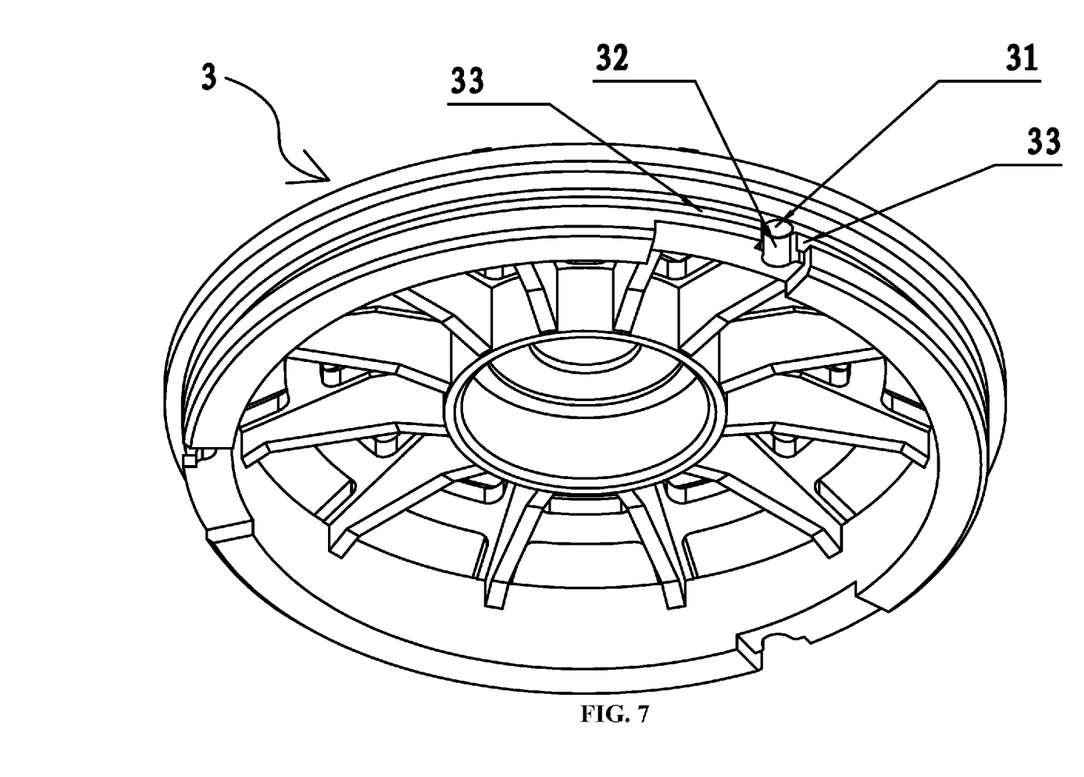
FIG. 7 is a stereogram of an end cover in accordance with one embodiment of the invention.

As shown in FIGS. 1-7, a DC brushless motor having an external rotor comprises: a shaft 1, a stator assembly 2, an end cover 3, a housing 4, and a plurality of permanent magnets 5. The shaft 1 is connected with the stator assembly 2. The stator assembly 2 is arranged inside the housing 4. The permanent magnets 5 are positioned outside the stator assembly 2 on an inner wall of the housing 4. The end cover 3 is disposed on an end of the housing 4. The shaft 1 is disposed on a bearing 6 of the end cover 3.

Example 2

On the basis of Example 1, the following technical features are added: a plurality of mounting bosses 41 is disposed on the end of the housing 4 above end surfaces of the permanent magnets 5. A threaded hole 410 is disposed on each mounting boss 41. A screw 7 passes through a through hole 31 of the end cover 3 and is screwed into the threaded hole 410 for fixing the end cover 3 on the housing 4.

Example 3

On the basis of Example 2, the following technical features are added: a gap 32 is arranged in an axial direction on a side wall of the end cover 3 outside the through hole 31. A recess 33 in a ring shape is arranged on the side wall of the end cover 3. The gap 32 is in communication with the recess 33. An end of the inner wall of the housing 4 is convex to form a fixture block 42, and the fixture block 42 passes through the gap 32 and is inserted into the recess 33.

Example 4

On the basis of Example 1, 2, or 3, the following technical feature is added: an end surface of the end cover 3 is provided with a plurality of clay recesses 34 for correcting a dynamic balance.

Example 5

On the basis of Example 1, the following technical feature is added: a mounting bracket 8 is arranged outside the housing 4.

Example 6

On the basis of Example 1, the following technical features are added: the stator assembly 2 comprises: a stator core 21, and a winding 22. The winding 22 is wound on the stator core 21. One end of an external lead 9 is connected with one end of the winding 22; the other end of the external lead 9 passes through a shaft hole 11 of the shaft 1.

Example 7

On the basis of Example 1, the following technical feature is added: the permanent magnets 5 are stuck to the inner wall of the housing 4 by glue.

The motor comprises: the shaft 1, the stator assembly 2, the end cover 3, the housing 4, and a plurality of permanent magnets 5. The shaft 1 is connected with the stator assembly 2. The stator assembly 2 is arranged inside the housing 4. A plurality of permanent magnets 5 is positioned outside the stator assembly 2 on the inner wall of the housing 4. The axial gap 32 and the annular recess 33 are arranged on the side wall of the end cover. The gap 32 is in communication with the recess 33. The fixture block 42 is arranged on the end of the inner wall of the housing 4. The fixture block 42 passes through the gap 32 of the end cover 3 and is inserted into the recess 33 to allow the through hole 31 of the end cover 3 to align with the threaded hole 410 of the mounting boss 41 of the housing 4, so that the end cover 3 is fixed on the housing 4 by inserting the screw 7 into the through hole 31 and the threaded hole 410.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A DC brushless motor, comprising:
   a) a shaft;
   b) a stator assembly;
   c) an end cover, the end cover comprising a bearing and a plurality of through holes;
   d) a housing, the housing comprising: a side wall comprising an inner surface and an end; and
   e) a plurality of permanent magnets;
   wherein
   the shaft is connected with the stator assembly;
   the stator assembly is arranged inside the housing;
   the permanent magnets are positioned outside the stator assembly and on the inner surface of the side wall of the housing;
   a plurality of positions of the end of the side wall of the housing protrudes from the end of the side wall of the housing and is bent toward the shaft whereby forming a plurality of mounting bosses that is integral with the side wall of the housing;
   an outer surface of each of the plurality of mounting bosses is substantially perpendicular to the inner surface of the side wall of the housing;
   each of the plurality of mounting bosses comprises a threaded hole;
   the end cover is disposed on the end of the housing, wherein the outer surface of each of the plurality of mounting bosses is in contact with the end cover;
   each of the plurality of through holes is directly connected to the threaded hole of one of the plurality of mounting bosses;
   the end cover is fixed on the plurality of mounting bosses by a screw;
   the screw extends through the through hole, is received inside the threaded hole, and does not protrude out of the threaded hole; and
   the shaft is disposed on the bearing of the end cover.

2. The motor of claim 1, wherein
   a gap is arranged in an axial direction on a side wall of the end cover outside the through hole;
   a recess in a ring shape is arranged on the side wall of the end cover;
   the gap is in communication with the recess;
   an end of the inner surface of the side wall of the housing is convex to form a fixture block; and
   the fixture block passes through the gap and is inserted into the recess.

3. The motor of claim 2, wherein an end surface of the end cover is provided with a plurality of clay recesses.

4. The motor of claim 1, wherein an end surface of the end cover is provided with a plurality of clay recesses.

5. The motor of claim 1, wherein a mounting bracket is arranged outside the housing.

6. The motor of claim 1, wherein
   the stator assembly comprises: a stator core, and a winding;

the winding is wound on the stator core;

one end of an external lead is connected with one end of the winding; and the other end of the external lead passes through a shaft hole of the shaft.

7. The motor of claim 1, wherein the plurality of permanent magnets is stuck to the inner surface of the side wall of the housing by glue.

\* \* \* \* \*